United States Patent [19]

Acitelli

[11] Patent Number: 4,816,186

[45] Date of Patent: Mar. 28, 1989

[54] WATER BASED AEROSOL FLAME-PROOFING COMPOSITION AND METHOD OF MANUFACTURE

[75] Inventor: Frank Acitelli, Wayne, Mich.

[73] Assignee: Amalgamated Chemical, Inc., Southfield, Mich.

[21] Appl. No.: 926,212

[22] Filed: Nov. 3, 1986

[51] Int. Cl.$^4$ .................. C09K 21/00; A62D 1/00
[52] U.S. Cl. ........................... 252/610; 169/9; 169/45; 169/71; 252/8; 252/305; 252/607; 252/608; 252/609
[58] Field of Search ............... 252/8, 2, 3, 608, 610, 252/607, 611, 609, 305, 306, 605; 169/45, 43, 9, 6, 71, 85; 8/490; 428/920, 921

[56] References Cited

U.S. PATENT DOCUMENTS

| | | | |
|---|---|---|---|
| 2,071,354 | 2/1937 | Morgan | 252/611 |
| 2,254,471 | 9/1941 | Cascio | 252/610 |
| 2,940,816 | 6/1960 | Sniegowski | 252/8 |
| 4,013,595 | 3/1977 | Podella et al. | 252/305 |
| 4,043,987 | 8/1977 | Jolicoeur et al. | 252/611 |
| 4,234,432 | 11/1980 | Tarpley, Jr. | 252/8 |
| 4,472,286 | 9/1984 | Falk | 252/2 |
| 4,533,490 | 8/1985 | Kluth et al. | 252/305 |
| 4,559,369 | 12/1985 | Bauman et al. | 521/154 |
| 4,584,324 | 4/1986 | Bauman et al. | 521/122 |
| 4,585,703 | 4/1986 | Taguchi et al. | 428/537.1 |

FOREIGN PATENT DOCUMENTS

| | | | |
|---|---|---|---|
| 0197267 | 11/1984 | Japan | 252/8 |
| 0218167 | 12/1984 | Japan | 252/8 |

*Primary Examiner*—Howard J. Locker
*Attorney, Agent, or Firm*—Arnold S. Weintraub

[57] ABSTRACT

Aerosol solutions for use in treating consumer goods to render them fire-proof are formulated for packaging under pressure in a valved container, and comprise a mixture of ammonium salts and an alkali metal silicate. The solution may further comprise one or more of urea, ammonium bromide, a low molecular weight alcohol, an aromatic oil, a surfactant, an acid, fragrance, etc. A method for making the solution is also disclosed.

1 Claim, No Drawings

WATER BASED AEROSOL FLAME-PROOFING COMPOSITION AND METHOD OF MANUFACTURE

BACKGROUND OF THE INVENTION

1. Field of the Invention

The present invention relates to flame-proofing sprayable aerosol compositions and the use thereof.

2. Description of the Prior Art

The application of a variety of chemicals to building materials, interior furnishings, textiles, carpeting and the like to decrease their flammability has long been recognized. In recent years, Federal and Local ordinances have set increasingly higher standards of resistance to flammability of materials such as children's clothing, bedding, textiles and draperies. Moreover, consumers have become increasingly aware of the importance of reducing the danger from flammability of objects in the home environment.

Fire retardant and fire-proofing chemicals have been applied to such materials as paint, lumber, carpeting, textiles, etc. as bulk treatments. That is, they have been applied by dipping, commercial spraying, painting and so forth. These bulk applications present no particular packaging problems but a more convenient method of application has been needed for consumer use.

U.S. Pat. No. 3,607,745 discloses compositions suitable for use in aerosol sprays for consumer applications. However, the composition disclosed by this reference contains various tris-compounds, all dangerous carcinogens. The undesirability of spraying such materials around the household environment is obvious.

Moreover, the prior art flame retardant compositions are not true flame-proofing compositions. They are, generally, designed to slow down the flame on a test surface by a specified percentage (usually 50%). That is, if a household fabric such as a drape were burning from bottom to top at a rate of 36 feet per minute, a retardant rated at 50% would have to slow the flame advance to 18 feet per minute. While household objects treated with such flame retardants would be less dangerously flammable than untreated objects, the possibility of accidental ignition thereof still remains.

There has existed a long felt need for a safe, non-toxic, non-carcinogenic, easily used consumer flame-proofing material that acts as more than a flame retardant.

SUMMARY OF THE INVENTION

The present invention contemplates a water-based aerosol composition which, when applied to a porous surface such as a textile, wood, building material, etc., imparts a flame-proofing quality thereto. The flame-proofing composition hereof, generally, comprises: a mixture of ammonium salts, and an alkali metal silicate. The above components are dissolved in water and the resulting aqueous solution, when used with an appropriate propellant, may be dispensed from a valved, pressurized container of a conventional type.

Additionally, the fire-proofing material may further comprise one or more of urea, an acid, ammonium bromide, a low molecular weight alcohol, an aromatic oil, a surfactant to enhance wetability, flame retarding fragrance, etc.

DESCRIPTION OF THE PREFERRED EMBODIMENTS

For a more complete understanding of the present invention, reference is made to the following detailed description and accompanying examples.

The fire-proofing compositions of the present invention generally comprise: (a) a mixture of ammonium salts, (b) an alkali metal silicate, (c) sulfuric acid and (d) a surfactant.

The mixture of ammonium salts includes:
(1) ammonium sulfate,
(2) a mixture of mono- and diammonium phosphate, and
(3) ammonium thiocyanate.

The alkali metal silicate may be a sodium silicate, potassium silicate and the like, as well as mixture thereof. Preferably, the alkali metal silicate is sodium metasilicate.

The surfactant can be either nonionic or anionic and is used to increase the wetability of the other ingredients to enhance absorption of the composition. Thus, any surfactant chemically compatible with the other components can be used herein. Thus, those sold commercially under the names PLURONIC, TETRONIC, PLURAPOT, TRITON, etc. can be used with equal efficacy herein.

The composition hereof, generally comprises:
(a) from about six to eleven percent by weight, of the ammonium sulfate,
(b) from about forty-nine to about sixty-two percent, by weight, of the mixture of phosphates, and
(c) from about 0.1 to about one and one-half percent, by weight, of the thiocyanate,
(d) from about 0.1 to one and one-half percent, by weight, of the alkali metal silicate, and
(e) from about 0.1 to about one percent, by weight, of the surfactant.

The balance of the composition is propellant. The propellant is optimally one which is storage stable, compressible and chemically compatible with the other components employed herein. Useful propellant include aliphatic ethers, alkane hydrocarbons and ketones, as well as mixture thereof. A suitable ether is dimethyl ether; suitable hydrocarbon include n-butane and i-butane. The ketone, when used, is used to promote drying of the other components. A particularly suitable ketone is acetone.

A particularly useful propellant for deployment herein comprises a mixture of dimethyl ether, i-butane and acetone. The propellant, generally, comprises:
(a) from about sixty to about eighty percent, by weight, of the ether;
(b) from about ten to about thirty percent, by weight, of the hydrocarbon, and
(c) from about ten to about fifteen percent, by weight, of the ketone.

The propellant composition is present in an amount ranging from about twenty percent to about fifty percent, by weight, based on the combined weight of propellant and flame-proofing composition.

Other ingredients which may be present are urea, an acid, ammonium bromide, a low molecular weight alcohol such as ethanol, propanol, i-propanol, butanol and the like, and an aromatic oil such as pine oil or lemon oil. One or more of these additional ingredients may be added to the composition to improve its flame-proofing qualities, its penetrability into a flammable substance, or to enhance other properties.

Where used, the urea is present in an amount ranging from about ten to about fifteen percent, by weight, based on the total weight of the composition; the bromide is present in an amount ranging from about fifteen to twenty-five percent, by weight, based on the total weight, and the alkanol is present in an amount ranging from about 0.5 to about 2.5 percent, by weight.

In use, the composition hereof is deployed as an aqueous solution thereof. Generally, the solution is about a 45% to 50% aqueous solution.

The method for making the flame-proofing sprayable aerosol composition hereof, generally, comprises forming a first liquid component and mixing it with a second liquid component. The first liquid component is formed by first forming a solution at a temperature of at least 130° F. of water, the bromide, the mixture of ammonium phosphate and the ammonium sulfate. To this solution is each of two solutions comprised, respectively, of (a) the ammonium thiocyanate and water and (b) the alkali metal metasilicate and water. Each of the solution is added at a temperature of 170° F. or above. To the resultant solution is added, sequentially water, the aromatic oil, the alkanol and the surfactant. This results in the formation of the first component.

The second component is formed by first forming a solution at a temperature of at least 130° F. of water and a mixture of the ammonium phosphates. To this solution is then added two solutions comprised of (a) the ammonium thiocyanate and water, and (b) the alkali metal silicate and water, both maintained at 170° F. or above. To the resultant solution is, then, added, sequentially, water, the sulfuric acid and surfactant. The first component is then added to the second component to form the composition hereof.

The resultant composition, when packaged, within a suitable aerosol is ready for use.

For a more complete understanding of the present invention reference is made to the following examples. In the examples, which are to be construed as illustrative, and not limitative of the invention, all parts and percentages are by weight.

EXAMPLE

This example illustrates the preparation of a flame-proofing composition in accordance herewith.

Into a suitable vessel maintained at 130° F. is added, with stirring, 377 parts of water, 195 parts of ammonium bromide, 195 parts of monammonium phosphate and 195 parts of diammonium phosphate.

To 770 parts of this solution is added, with stirring, and at a temperature of 170° F. a first additive of (1) 3 parts of ammonium thiocyanate and (2) 35 parts of water. Thereafter, at a temperature of 170° F. a second additive of 3 parts of sodium metasilicate.

To this resultant solution is, then added, sequentially, and with stirring, 1/10 part of pine oil, ½ part of 90% isopropanol and 1/10 part of a surfactant sold commercially under the name TRITON N101.

In a separate vessel maintained at a temperature of 130° F. is added, with stirring, 699 parts of water, 277 parts of monammonium phosphate and 31 parts of diammonium phosphate.

To 415 parts of the solution is, then, added 9.3 parts of a solution prepared by dissolving 108 parts of ammonium thiocyanate in 892 parts of water. This solution is added at a temperature of 170° F. Nine and three-tenths part of another additive maintained at 170° F. is, then, added. This second additive is prepared by dissolving 108 parts of sodium metasilicate in 892 parts of water.

To the resultant solution is, then added 38 parts of water, ¼ part of sulfuric acid and 3/10 part of the same surfactant identified above.

The first and second components are, the, mixed together to form the flame-proofing composition hereof.

The composition hereof has the following anhydrous composition:

|  | Percent (wt %) |
| --- | --- |
| monammonium phosphate ($NH_4H_2PO_4$) | 33.5 |
| diammonium phosphate (($NH_4)_3HPO_4$) | 20.9 |
| ammonium bromide ($NH_4Br$) | 19.2 |
| ammonium sulfate (($NH_4)_2SO_4$) | 8.7 |
| sulfuric acid ($\_MH_2SO_4$) | 2.9 |
| isopropanol (90% $CH_3CHOHCH_3$) | .8 |
| sodium metasilicate ($Na_2SiO_3$) | .5 |
| ammonium thiocyanate ($NH_4CNS$) | .5 |
| surfactant (Triton N 101) | $\leq .2$ |
|  | 100.0 |

The composition is a white crystalline solid when anhydrous. It has a pH in a 10% solution of 5.75. The solubility is 45 grams/100 milliliters of water. It will impart flame retardant properties to any absorbent material, and is suitable for a wide range of both natural and synthetic materials, including curtains, upholstery, paper, cardboard, unfinished lumber, wall board, ceiling panels, hardwood, wallpapers, cork, expanded polystyrene and polyurethane foam, particle board, plywood, carpets, etc. When treated with the composition, carpets will automatically have an antistatic quality. A substrate to which the fire-proofing composition is applied should not be dried at temperatures greater than 250° F. Best results are obtained by drying the substrate naturally.

In tests of the fire-proofing composition of the Example, there was no ignition of listed materials sprayed with the composition, even when exposed to steady flame. While not wishing to be limited by the following explanation, it is believed that the composition sprayed on the material remains essentially unchanged until heat or flame is applied. At that point, the composition reacts to the heat, combining with the combustible gases and tars contained in and released by the flammable substrate and converting said gases and tars to carbon-char, nitrogen and carbon dioxide. Since one of the basic elements of the fire triangle, fuel, is removed by the fire-proofing composition, a material so treated will not burn.

Because the formulation has a pH of 5.0 to 6.0 it tends to be unstable when contained in tin plate steel cans. The valved container of choice to contain the composition of the present invention is made substantially of aluminum.

While the invention has been described with regard to certain preferred embodiments and exemplifications, it is not intended to be limited thereby but solely by the claims appended hereto.

I claim:

1. A method for producing a fire-proofing material adapted when retained in a valved container to be pressurized and self-dispensing when operably associated with a normally liquid propellant, said method comprising:

forming a first component by the steps of:
- forming a first solution at a temperature of at least 130° F. of water, ammonium bromide, a mixture of ammonium phosphates, and ammonium sulfate;
- adding to the first solution a second solution comprised of ammonium thiocyanate and a third solution comprised of an alkali metal silicate and of water, thereby forming a fourth solution, the second and third solutions having a temperature of at least 170° F.; and
- adding sequentially to the fourth solution cold water, an aromatic oil, an alkanol, and a surfactant to form a fifth solution; and forming a second component by the steps of:
- forming a sixth solution at a temperature of at least 130° F. comprised of water and a mixture of ammonium phosphates;
- adding to the sixth solution a seventh solution comprised of ammonium thiocyanate and water, and an eighth solution comprised of an alkali metal silicate and water thereby forming a ninth solution, the seventh and eighth solutions having a temperature of at least 170° F.; and
- adding sequentially to the ninth solution water, sulfuric acid, and a surfactant to form a tenth solution; and
- admixing the fifth and tenth solutions.

* * * * *